Figure 1:
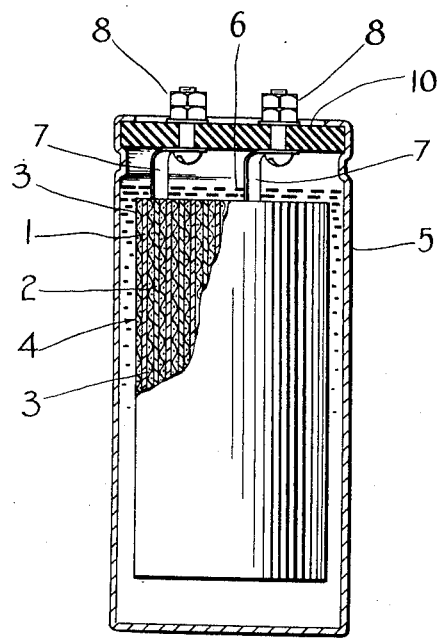

Feb. 26, 1935.                P. ROBINSON                1,992,545
ELECTROLYTIC DEVICE
Filed Oct. 25, 1933

PRESTON ROBINSON
INVENTOR

BY *Dorsey & Cole*
ATTORNEYS

Patented Feb. 26, 1935

1,992,545

UNITED STATES PATENT OFFICE 1,992,545

ELECTROLYTIC DEVICE

Preston Robinson, Williamstown, Mass., assignor to Sprague Specialties Company, North Adams, Mass., a corporation of Massachusetts Application October 25, 1933, Serial No. 695,183

7 Claims. (Cl. 175—315)

The present invention relates to electrolytic condensers and particularly to condensers having a highly viscous or pasty electrolyte, which condensers are generally referred to as dry electrolytic condensers.

Such condensers comprise, as a rule, two metal plate or metal foil electrodes, at least one of which is of film-forming material, for instance, of aluminum, tantalum, zirconium, etc., while the other may be either of filming or non-filming material. One or both electrodes are provided with an electrolytically formed oxide film and between the electrodes is interposed a more or less viscous electrolyte.

Between the electrodes there may be provided an absorbent spacer, for instance, a gauze or cellophane spacer, which also serves as a carrier for the electrolyte, although such spacer may be dispensed with.

The electrolyte as a rule comprises a weak acid, for instance, boric acid, phosphoric acid, citric acid, etc., and preferably also a salt of a weak acid, which however does not need to be the salt of the acid used.

The acid and the salt form the ionogen for which there is provided in the electrolyte an ionizing solvent, which comprises as a rule a polyhydric alcohol, for instance, glycerine, ethylene glycol, dextrose, etc. and also a fixed amount of water. The electrolyte may also comprise one or more inert substances which may serve to increase its viscosity, for instance, bentonite, starch, silica gel, boric acid, etc. It may also comprise a finely divided conducting material such as magnetite, lead peroxide, graphite, colloidal silver, etc. to increase its conductivity, and also its viscosity.

For the successful operation of the condenser various conditions have to be fulfilled. Among others, it is imperative that the film of the filmed electrode or electrodes be covered by the electrolyte throughout its (or their) full surface and that the electrolyte should retain a fixed position relative to the film.

Furthermore, the evaporation of the ionizing solvent or solvents should be prevented. Such ionizing solvents have appreciable vapor pressures even at ordinary temperatures, which are furthermore increased when the temperature of the condenser rises in operation, and unless such volatilization or evaporation is prevented the loss in the amount of ionizing solvent causes a gradual increase in the resistance of the electrolyte, with a corresponding increase of its power factor, and also otherwise deleteriously influences the characteristics of the condenser.

On the other hand, if the atmosphere surrounding the condenser is of high humidity the condenser may absorb water from the air, which again changes the operating characteristics of the condenser and if such absorption of moisture is considerable, it even may increase the fluidity of the electrolyte to such a point where it may be easily displaced from the filmed surface, a phenomenon referred to as "bleeding of the electrolyte".

To avoid these difficulties, present-day dry electrolytic condensers are provided with enclosing casings. In one type of construction a sealed metal container is used which loosely surrounds the condenser roll, and the space between the roll and the container is filled out with a sealing compound, or air space is left between the roll and the container. In another type of construction, the condenser is inserted into a cardboard container and the space between the container and the condenser is filled out with a sealing compound.

While such constructions prevent deterioration of the condenser through access of moisture, or the excessive evaporation of the ionizing solvent, these constructions have the common drawback of poor heat transfer from the condenser to the surroundings, as the insulating compound or the air disposed between the container and the condenser roll are both poor heat conductors.

In the operation of these condensers, especially of those operating on alternating current or on rectified current comprising large alternating current ripples, considerable heat development takes place within the condenser and this heat, unless dissipated, causes temporary or permanent deterioration of the condenser. This drawback has prevented the use of such electrolytic condensers in many applications, as the heat dissipation from the condenser limits the electric energy which the condenser is able to handle. Thus while electrolytic condensers could be used to good advantage in certain circuit arrangements and under given load conditions for short duration loads, such condensers were entirely unsuitable for similar or even small loads for extended or continuous operation. Thus in most cases where condensers have to operate with continuous load on alternating current circuits, paper condensers had to be used in spite of the inherent economic advantages of electrolytic condensers.

While it is true that by increasing the size of such condensers, the operating temperature could be somewhat reduced; but as a very considerable increase of size provides only for a small decrease in operating temperature, such approach of the problem is impractical, and would result that the electrolytic condensers would be at least as expensive and as large in size, as the impregnated paper condensers which they are to replace.

In accordance with my invention, the condenser proper is provided in a metallic container and the space between the container and the condenser proper—which forms a roll or a stack—is filled out with an oil into which the condenser is thus immersed. The oil thereby acts as a sealing and electrical insulating, as well as a cooling and heat-transfer medium for the condenser.

The use of oil for sealing, for electrical insulating, as well as for cooling purposes, is well-known in connection with several electrical devices, for instance, with transformers, switches, etc. It has also been proposed to immerse in oil, wax-impregnated paper condensers. In connection with electrolytic devices oil has not been used, except for devices having liquid electrolytes and which devices were maintained at all times in a position in which, because of the difference in the specific gravity of the oil and of the electrolyte and/or of the provision of mechanical separators, mixing of the two was prevented.

To submerse directly into oil, the rolls or stacks of electrolytic condensers having viscous electrolytes and designed to be mounted in any odd position, seemed however unfeasible and so far as I know has never been attempted or even suggested.

In condensers of this type the more or less viscous electrolyte is of a complex nature and in addition is usually carried by absorbents, and should such condensers be directly submersed in oil, one of many undesirable occurrences may take place, any of which would interfere with the proper operation of the condenser. Among other things, there is the danger of the oil mixing with the electrolyte or the oil being absorbed by the spacer, or the electrolyte being attacked or contaminated by the oil, or the oil being attacked or contaminated by the electrolyte or the spacer, including the danger of secondary reactions between these elements. The avoidance of all these troubles seems, therefore, to offer unsurmountable difficulties.

During the operation of the condensers these difficulties are further accentuated, as the electrolyte, due to the heat development within the condenser, becomes more fluid, promoting the "bleeding" of the electrolyte into the oil.

I have found, however, that all of these difficulties can be fully overcome by proper selection of the oil and of the electrolyte—including all of the components thereof—and of the absorbents as well as of other elements which form part of the condenser. These requirements are briefly as follows:—The oil must be of such nature that it should neither attack the electrolyte nor be attacked by same. It should be a neutral and stable oil, and should retain its neutrality and stability indefinitely. Its flash point and boiling point should be comparatively high and preferably at least 150° C. I have found that several mineral oils, especially high grade transformer oils, as well as chlorinated diphenyl and other chlorinated hydro-carbons, can be successively used with suitable electrolytes.

The ionogers of the electrolytes suitable for this purpose comprise, as a rule, weak acids and salts of weak acids. As far as the weak acids are concerned, practically all of the weak acids which are suitable for dry electrolytic condensers, as boric acid, phosphoric acid, citric acid, tartaric acid, etc., can be used without drawback.

However, in the selection of the salt of a weak acid, certain classes of salts have to be carefully avoided. For instance, the salts of the weak fatty acids, for instance, the salts of stearic or oleic acids, have a highly deleterious influence, since salts of such acids tend to promote the formation of an emulsion between the oil and the electrolyte. This deleterious influence of salts of fatty acids manifests itself even if they are present only in small quantities, for instance, incident to the specific process of manufacture of the components of the electrolyte.

Special care has to be taken in the selection of the spacer, which is quite likely to contain small quantities of fatty acids or other acids with which the salts of the electrolyte may react to form fatty salts. For instance, if the electrolyte comprises ammonium borate and there be some fatty acid in the spacer, for instance, stearic acid, the ammonium borate may form therewith ammonium stearate, which in its turn may cause the emulsification of the oil and the electrolyte. I have found, for instance, that when operators in the manufacture of such condensers use cold cream on their hands—a practice which has been introduced to prevent dermatitis in handling the electrolyte—and the cold cream comprises emulsifying agents, such agents introduced in the condenser cause emulsification of the oil and electrolyte.

To free the spacer from any acids which thus might directly or indirectly cause the emulsification of the oil and the electrolyte, I prefer to wash the spacer prior to its use in the condenser, in alcohol or ether, although gauze spacers which are specially bleached and purified after manufacture do not require as a rule such washing. In any case great care should be taken that in any handling of the spacers their contamination by fatty acids or by other substances which may cause emulsification be prevented.

Furthermore, in the selection of the electrolyte any constituents thereof which may be soluble in the oil should be carefully avoided; for instance, in selecting the polyhydric alcohol used as ionizing solvent of the electrolyte, the group of aromatic hydrocarbons which are soluble in the oil should be carefully avoided.

I have also found that the bleeding of the electrolyte and its mixing with the oil, which due to the heat development in operation can be expected, is practically avoided, because with my invention the cooling of the condensers can be made so efficient that high temperatures at which this phenomenon might occur can be avoided altogether. Furthermore, the potential prevailing in operation between the electrode foils, exerts an electric force on the electrolyte which helps to retain it in the spacer.

In accordance with my invention, the condenser roll (or stack) is disposed in a metallic container and the space between the container and the condenser roll is filled out with an oil into which the roll is thus immersed.

The submersion of the condenser into oil, as stated, not only prevents evaporation of the ionizing solvent and protects the condensers from excessive moisture, but provides for a rapid and efficient transfer of the heat generated in the condenser to the walls of the metal container and the surroundings.

The improvements obtained by the cooling effect of the oil are very great, and much more pronounced than the cooling effect of oil in known application, for instance than in the case of oil immersed impregnated paper condensers. This is apparently due to the fact that the heat-transfer from the electrolyte to the oil is much greater than the heat transfer from the wax impregnated paper.

As a result thereof, in all applications of electrolytic condensers in which considerable heat development takes place and where thus this factor is predominant in the designing of the electrolytical condensers, my novel construction permits a very material decrease in the overall dimensions of the condenser or permits its use for increased duties, and at the same time also considerably increases the useful life of the condenser.

Furthermore, in all of the cases where dry electrolytic condensers—although suitable as far as voltage conditions were concerned—could not be used because prolonged or continuous operation would cause them to heat up above the permissible operating temperature of electrolytic condensers, (which is about 60-70 degrees) and where therefore the more expensive and bulkier impregnated paper condensers had to be used, electrolytic condensers embodying my invention may now be successfully used.

While the reduction in the operating temperature of the electrolytic condensers obtainable with my invention, depends on many factors and varies accordingly, the following example suitably illustrates the striking advantages obtainable therewith.

A standard 13 mfd. condenser, designed for 180 volts alternating current work and placed in the standard way in a container, with either an insulating compound or air space between the container and the condenser roll, attains under given operating conditions and after one hour's continuous use, a temperature of 100° C. This temperature is far above the permissible operating temperature of such condensers, which is 60°-70° C. After one hour's use, these condensers therefore show a very marked and permanent deterioration, for instance a partial destruction of the film, an increase of the power factor beyond the permissible limits, etc. Such condensers, after one hour's operation, are therefore practically useless.

On the other hand, when submitting, under the same conditions, similarly made condensers in which, however, the condenser roll is submerged in oil, condensers after one hour's operation assume a final temperature of about 60° C., at which temperature the condensers can operate practically indefinitely without any deterioration.

My invention makes it possible to use electrolytic condensers in various applications where the conditions were too severe for prior art electrolytic condensers. For instance, in capacitor motors as "starting" condensers, which are under load only for one or two seconds, electrolytic condensers have been successfully used; however, prior to my invention electrolytic condensers could not be successfully used as the "running" condensers for these motors, which condensers are under continuous load while the motor is running. My invention makes it now possible to use electrolytic condensers also as "running" condensers of capacity motors, the price and size of which is less than one-half of that of the impregnated paper condensers which they can replace.

Another advantage of the submersion of dry electrolytic condensers into oil is especially apparent when the condenser is to be used for alternating current of comparatively high voltage for instance 220 volts or above.

In this case the intense electric field generated in the film is liable to cause ionization at the film and in its turn ionization of the air, and this irrespective of whether there is an air space between the condenser and the container or a more or less porous insulating compound. In both cases this ionization of the air may lead to the formation of an arc and thereby brings about the failure of the condenser. On the other hand, the oil surrounding the condenser having a much higher sparking voltage and being much more resistant to ionization than air, permits the application of much higher voltages without any danger of arcing.

In the drawing forming part of the specification:

The figure is a side view partly in cross-section, of a condenser embodying my invention.

The condenser proper consists of two electrode foils 1 and 2 of which at least one is of film-forming material, for instance of aluminum, tantalum, zirconium, etc., and is provided with an electrolytically-formed film, which film is a partly hydrated oxide film, and is preferably formed on the electrode prior to its assembly in the condenser.

In case the condensers are used for rectified current, only one electrode needs to be filmed. However, for condensers used for alternating current, both electrodes are provided with a film. The formation of the film preferably takes place by the method described in my copending application Ser. No. 548,270, filed July 1, 1931.

The electrodes are assembled into a condenser assembly, for instance, as shown, spacers 3—3 are wound together with electrode foils 1 and 2 into a roll. The spacers 3 consist of suitable absorbent material which, besides meeting the usual requirements of such spacers employed in "dry" electrolytic condensers, must also meet the requirements imposed by the presence of the surrounding oil as previously set forth.

Preferably the spacers are wound into a roll with the electrode foils prior to their impregnation with the electrolyte, the impregnation taking place by the process described in my copending application Serial No. 690,142, filed September 19, 1933.

The electrolyte used, as a rule, comprises a weak acid, for instance, boric acid, phosphoric acid, citric acid, etc., and preferably also a salt of a weak acid, which, however, does not need to be the salt of the acid used.

The acid and the salt form the ionogen, and the ionizing solvent for same comprises as a rule a polyhydric alcohol, for instance, glycerine, ethylene-glycol, dextrose, etc., and also a fixed amount of water. The electrolyte may also comprise one or more inert substances which may serve to increase its viscosity, for instance, bentonite, starch, silica gel, boric acid, etc., or/and a finely divided conducting material, such as magnetite, lead peroxide, graphite, colloidal silver, etc., to increase both its conductivity, as well as its viscosity.

In the drawing the electrolyte carried by the spacer is indicated by the numeral 4.

The condenser is provided with terminal leads 7—7 which may form integral projecting portions of the electrodes 1 and 2.

After its impregnation the condenser assembly is inserted in a container 5, preferably of metal, sufficient interspace being provided between the condenser assembly and the walls of the container, this interspace being filled out with a suitable oil 6 into which the condenser assembly is fully submerged.

The open end of the container is closed by a cover 10 of insulating material through which pass the terminals 7—7 or conductors connected thereto, which are connected in their turn to terminals 8—8 provided on the cover 10.

The constituency of the electrolyte, of the spacer material and of the oil has to be such that no deleterious influence should be exerted by any one on the other. For instance, as stated, the weak acid of the electrolyte may contain no fatty acids, the spacer may not contain either fatty acids or other acids with which the salts of the electrolyte may react to form fatty salts; the oil must be neutral and of great stability, etc.

It should be well understood that the condenser assembly instead of being formed as a roll may form a stack. Nor is it necessary for the electrolyte to be carried by a spacer, as the electrolyte itself may act as the spacer between the electrodes of opposite polarity.

In the claims the term "dry" electrolytic condenser refers to electrolytic condensers in which the electrolyte has a reduced fluidity.

While I have described my invention in connection with specific embodiments and in specific examples, I do not wish to be limited thereto, but desire the appended claims to be construed as broadly as permissible in view of the prior art.

What I claim as new and desire to secure by Letters Patent is:

1. In an electrolytic condenser of the dry type, a condenser assembly adapted to operate in any position and comprising a filmed electrode and a second electrode, a viscous electrolyte between said electrodes and an inert oil surrounding said condenser assembly, said electrolyte and oil having a common circulating path.

2. In an electrolytic condenser comprising a filmed electrode and a second electrode, a spacer between said electrodes, said spacer being freed from fatty acids, an electrolyte carried by said spacer comprising a weak acid which is free from fatty acids, and an inert oil in which said assembly is immersed.

3. In an electrolytic condenser, a condenser assembly comprising a filmed electrode and a second electrode, absorbent spacers between said electrodes, said spacers being free from fatty acids, an electrolyte carried by said spacers comprising a weak acid and a salt of a weak acid, said spacers being also free from acids which may form fatty salts with salts of the electrolyte, and an inert oil surrounding said assembly.

4. In an electrolytic condenser, a condenser assembly comprising two filmed electrodes, an absorbent spacer between said electrodes, an electrolyte carried by said spacer comprising a weak acid and a salt of a weak acid, and an ionizing solvent comprising a polyhydric alcohol and water, a cooling oil surrounding said assembly, said spacer, electrolyte and oil being of such character that the oil and the electrolyte do not produce with each other a stable emulsion and are void of constituents which are mutually soluble to a marked extent.

5. In an electrolytic condenser, a condenser assembly comprising a filmed electrode and a second electrode, and an electrolyte in said condenser assembly comprising a weak acid and a polyhydrous alcohol, and an oil surrounding the condenser, said oil having a high flash point and a high boiling point and being substantially neutral and of great stability, said weak acid being void of fatty acids and said alcohol being void of aromatic alcohols.

6. An electrolytic condenser comprising a container, a condenser assembly within said container and spaced from the walls thereof, a viscous electrolyte with which said assembly is impregnated, a cooling fluid in said container, said electrolyte and fluid having a common circulating path, said fluid being inert with respect to said electrolyte within the range of the operating temperatures of said condenser, said electrolyte-impregnated assembly contacting on its entire exposed surface with the cooling fluid.

7. An electrolytic condenser comprising a container, a condenser roll within said container and spaced from the walls thereof, said roll comprising electrodes and interposed fabric spacers, and a viscous electrolyte with which said spacers are impregnated, a cooling fluid in said container which is inert with respect to said electrolyte and said spacers within the range of the operating temperatures of said condenser, said fluid contacting with the entire exposed surface of the electrolyte-impregnated roll and having a common circulating path with the electrolyte.

PRESTON ROBINSON.